(12) United States Patent
De Francesco et al.

(10) Patent No.: US 7,236,451 B2
(45) Date of Patent: Jun. 26, 2007

(54) DYNAMIC TIME METERED DELIVERY

(75) Inventors: Richard De Francesco, Voorhees, NJ (US); Bernard Harris, Dobbs Ferry, NJ (US); Wade Darlington, Morrestown, NJ (US); Rodney Barnhart, Wyncote, PA (US); Kenneth Abend, Huntingdon Valley, PA (US); Jack Starrantino, Warmington, PA (US); Irving Susskind, Wynnewood, PA (US); Borys Umyn, Columbus, NJ (US)

(73) Assignee: Telepulse Technologies Corporation, Alexandria, VA (US)

( * ) Notice: Subject to any disclaimer, the term of this patent is extended or adjusted under 35 U.S.C. 154(b) by 1032 days.

(21) Appl. No.: 10/378,505

(22) Filed: Mar. 3, 2003

(65) Prior Publication Data

US 2004/0076222 A1 Apr. 22, 2004

Related U.S. Application Data

(60) Provisional application No. 60/360,985, filed on Mar. 1, 2002.

(51) Int. Cl.
*H04J 11/00* (2006.01)
(52) U.S. Cl. ............ 370/208; 370/465; 370/463; 375/142; 375/222; 375/254; 375/285
(58) Field of Classification Search ........... 370/203, 370/208, 204, 205, 201, 286, 289, 265, 463; 375/141, 142, 222, 254, 285
See application file for complete search history.

(56) References Cited

U.S. PATENT DOCUMENTS

| 5,280,472 | A | * | 1/1994 | Gilhousen et al. | 370/335 |
| 6,473,449 | B1 | * | 10/2002 | Cafarella et al. | 375/141 |
| 2004/0156427 | A1 | * | 8/2004 | Gilhousen et al. | 375/150 |
| 2005/0265430 | A1 | * | 12/2005 | Ozluturk et al. | 375/145 |
| 2006/0193373 | A1 | * | 8/2006 | Agee et al. | 375/141 |

\* cited by examiner

*Primary Examiner*—Ajit Patel

(74) *Attorney, Agent, or Firm*—Fulbright & Jaworski LLP

(57) ABSTRACT

Dynamic Time Metered Delivery (DTMD) is a unique physical layer communication Method. DTMD uses enhanced time-based techniques to enable and control the flow of more data/Hertz through a variety of transmission media including existing and new copper phone lines, coaxial cable, fiber optic, powerline and wireless RF, Optical and Acoustic, to and from a comprehensive, multi-function customer data gateway. The system measures the transmission parameters as viewed from the "end of the line" and then sends these numerics back to the source which alters the shape of the basic signal structure such that when received at the far end, it will have maximum recognition attributes against interferers and noise. The present system and method add the adaptivity to the line conditions and set a maximum allowable data rate within the subscribed levels of performance.

32 Claims, 8 Drawing Sheets

Figure 3. Advanced CPE "Gateway" example.

Figure 4. Sample Application View

Figure 5. Basic rendering of the "Crankshaft" profile

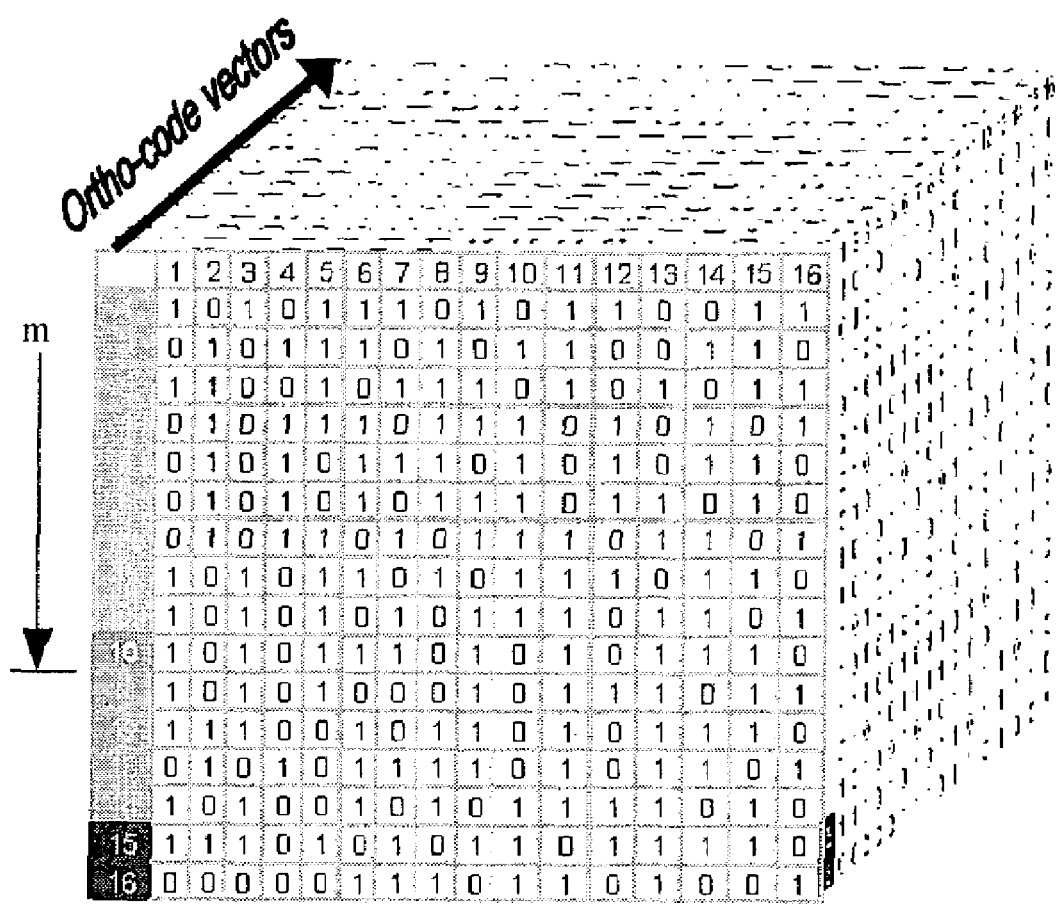
Figure 7. Ortho-Vector Cube

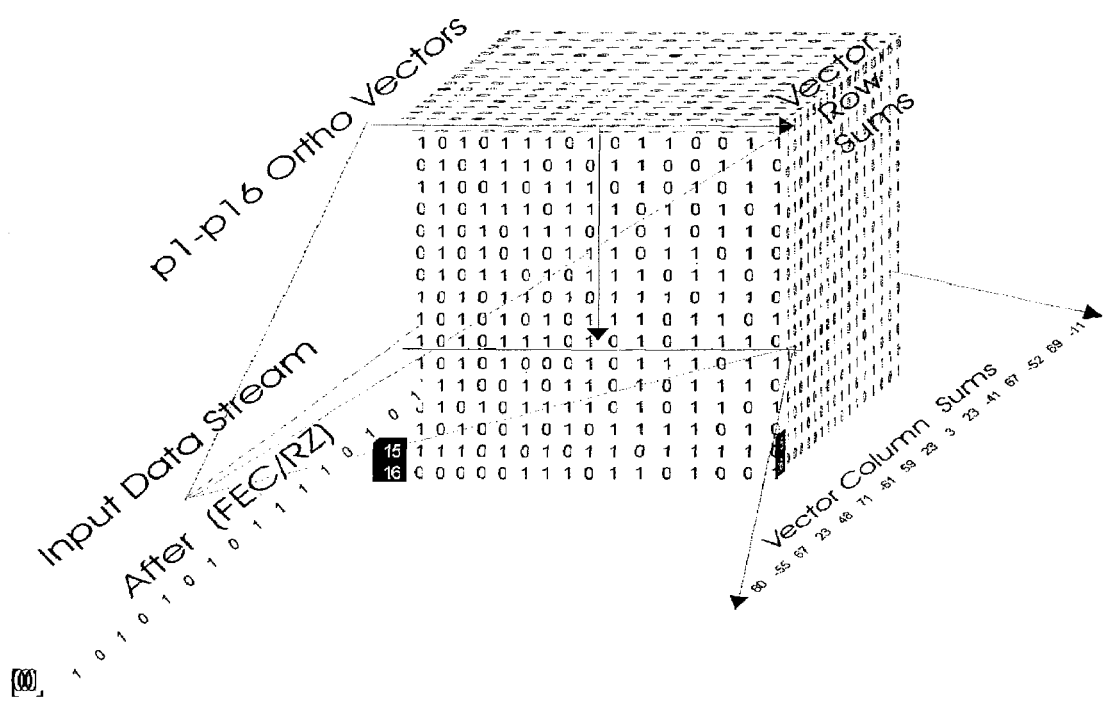
Figure 8. Ortho-Vector Cube Data Flow

DYNAMIC TIME METERED DELIVERY

RELATED APPLICATION

This application is a continuation-in-part (CIP) application of U.S. Provisional Application Ser. No. 60/360,985 filed Mar. 1, 2002, which is incorporated by reference in its entirety.

FIELD OF THE INVENTION

The present invention relates to a broadband data communications system and method, more specifically to a dynamic time metered delivery (DTMD) system and method.

BACKGROUND OF THE INVENTION

Broadband data communications using some form of Digital Subscriber Loop or Line (DSL) for the general population over guided media, e.g., telephone Wireline, have encountered a practical and economical limit. There are several different kinds of communication techniques currently in use that are mutually incompatible yet try to cover various combination of data rate and distance, e.g., high bit-rate DSL (HDSL), HDSL II, asymmetric DSL (ADSL), G.lite (known as universal ADSL), symmetric DSL (SDSL), very high bit-rate DSL (VDSL), G.SHDSL (an international standard for symmetric DSL developed by the International Telecommunications Union (ITU)), integrated services digital network (ISDN), T-1, etc. These various communication techniques employed by the different broadband services involve tradeoffs between data rates and serviceable distance (i.e., service area). Also, the shortcomings of DSL are well known to one skilled in the art and are the driving factors behind the frequent evolution in DSL formats. Distances beyond three miles from the telephone company's (or Telco's) central office (CO) are rarely served by the current DSL system.

It is appreciated that data rates above 1.5 Mbps for low cost DSL services threaten the telephone companies' lucrative T-1 service, a dedicated phone connection supporting data rates of 1.544 Mbits per second. A T-1 line consists of 24 individual channels, each of which supports date rates of 64 Kbits per second. Various DSL services can provide data rates above 4–6 Mbps, but their service range is restricted to less than half a mile. The latest and most expensive DSL service, VDSL, can provide data rates over 20 Mbps and is restricted to less than 1 mile.

With existing asymmetric DSL systems, such as ADSL, VDSL and G.lite, higher data rates can be achieved in one direction at the expense of the return data path, such as providing more bandwidth going downstream from the Internet to the user and less bandwidth going upstream from the user to the Internet. However, these upstream and downstream bandwidth allocations are predefined in the design and cannot be customized to meet an individual customer's needs. The number of data rates currently available to customers is fixed by the design limitations of the existing or fielded systems. That is, the particular date rates of a given DSL system can be provided only to those customers who are located within the system specified distance (i.e., service range) from the Telco's central office. The DSL system cannot provide services to those customers who are located outside the service range.

Additionally cable, terrestrial broadcast radio frequency (RF) and satellite services suffer from a fixed bandwidth broadcast-based topography that causes the data rates to diminish almost proportionately with increased number of customers and demand. That is, these current broadbased systems are not easily scalable, thereby posing problems for broadbased applications requiring large bandwidths. In cable systems, the cable or service provider generally dedicates a video channel's bandwidth of 6 MHZ for broadband service to generate approximately 40 Mbps of data rate over a coax shielded cable guided media path. This enables the cable provider to provide 200 kbps data rate service to 200 customers. However, peak rates can be much higher which can pose a potential problem if it is fully loaded with 200 customers.

Satellite systems have a similar fixed bandwidth problem today. Each of the 24 transponders on a Galaxy class DES satellite from Hughes Communications, Inc. (see http://www.adec.edu/satdb/gal4rku.html) is a 36 MHz RF channel to cover a terrestrial footprint equal to the East Coat and inland for about 500 miles. Assuming a data rate of 100 Mbps for this RF channel, then the satellite provider can provide 400 kbps data rate service to 250 customers, which translates to 6000 customers if the entire satellite's 24 transponder channels are used. However, this system does not scale up easily without severe dilution, thereby posing potential problems for broadbased application requiring large bandwidths.

In the cable case, uplink detracts from downlink bandwidth and the number of net new paying customers. In the satellite case, uplink is by slow dial-up phone line (i.e., low data rate)

The nature of the frequency based signal modulation technique of DSL makes it very sensitive to cross-talk from ISDN and T-1 services as well as other DSL channels in the same cable grouping/binder. Accordingly, this further limits the number of customers that can be served in a common wire bundle. The servicing company, whether a Telco (i.e., an incumbent local exchange carrier or ILEC) or a competitive local exchange carrier (CLEC), has to qualify the telephone line for broadband service typically by sending a technician out in a truck to evaluate the line which can be time consuming and expensive. The technician often changes the selection of wire pairs in the wire bundles to get the best connections. This process can be expensive and frequently leads to follow-up service calls due to technician error. Also, bridged taps along the Wireline reduce availability and performance of the DSL service. Additionally, all of the frequency based services have many discrete frequency tonals that can radiate into AM and Ham Radio frequency bands. All of these factors have resulted in a virtual cap on the size of the servable customer base for the current DSL system. Hence, the percentage of U.S. households with DSL service or the DSL household penetration has been limited to about three percent of the total U.S. households. In other words, the current DSL services represent approximately only three percent of the total Wireline market.

Therefore, it is desirable to expand the current broadband market presence by providing a broadband system and method that goes beyond the performance limits of current broadband systems, including various types of DSL systems, and minimize their associated technical and business weaknesses.

SUMMARY OF THE INVENTION

Therefore, it is an object of the present invention to provide a broadband data communications system and method that overcomes the shortcomings of the current broadband systems.

It is another object of the present invention to provide a dynamic time metered delivery (DTMD) system and method which remediates the "digital divide" and provides the "last mile(s)" with connectivity from high-speed (broadband) data services especially with regard to applications that require multiple channels of data in each direction across the media.

It is a further object of the present invention to provide a broadband system and method which provides higher data rates at longer distances (e.g., over 3 miles) and at lower cost than currently available DSL systems by using adaptive performance means that automatically adjust to the condition of the media.

The DTMD system and method of the present invention addresses two requirements of current and future broadband service: affordable data rates with greater serviceable range (i.e., longer distance from the Telco's central office) and Federal Communications Commission (FCC) Title VI mandate for high definition TV capability for any regulated communication service provider that provides broadcast video. Presently the FCC definition of broadband is 200 Kbps. It is appreciated that the inventive DTMD system and method can be utilized by a variety of network devices, such as multi-function customer gateways, to affordably provide higher bandwidth in delivering broadband services, such as Internet access, bi-directional audio and video services.

The inventive adaptive broadband signal techniques of the DTMD system and method do not relate to any technique utilized in the current DSL or other guided-media communications systems. In accordance with an embodiment of the present invention, the DTMD system and method can be utilized in any point-to-point and shared or multi-line transmission mediums, including but not limited to the telephone Wireline, RF, Coax, etc.

In accordance with an embodiment of present invention, the DTMD method is a unique physical layer communication Method. The DTMD system and method uses enhanced time-based techniques to enable and control the flow of more data/Hertz through a variety of transmission media including existing and new copper phone lines, coaxial cable, fiber optic, powerline and wireless RF, Optical and Acoustic, to and from a comprehensive, multi-function customer data gateway. The essence of the DTMD method could properly be called "pulse shape" encoding. The system measures the transmission parameters as viewed from the "end of the line" and then sends these numerics back to the source which alters the shape of the basic signal structure such that when received at the far end, it will have maximum recognition attributes against interferers and noise. The present system and method add the adaptivity to the line conditions and set a maximum allowable data rate within the subscribed levels of performance.

Various other objects, advantages and features of the present invention will become readily apparent from the ensuing detailed description, and the novel features will be particularly pointed out in the appended claims.

BRIEF DESCRIPTION OF THE DRAWINGS

For a more complete understanding of the present invention, reference is now made to the following descriptions taken in conjunction with the accompanying drawing, in which:

FIG. 7 is an exemplary ortho-vector cube in accordance with an embodiment of the present invention; and FIG. 8 is an exemplary ortho-vector cube diagram showing the data flow into and out of the cube in accordance with an embodiment of the present invention.

BRIEF DESCRIPTION OF THE INVENTION

Figure 1:
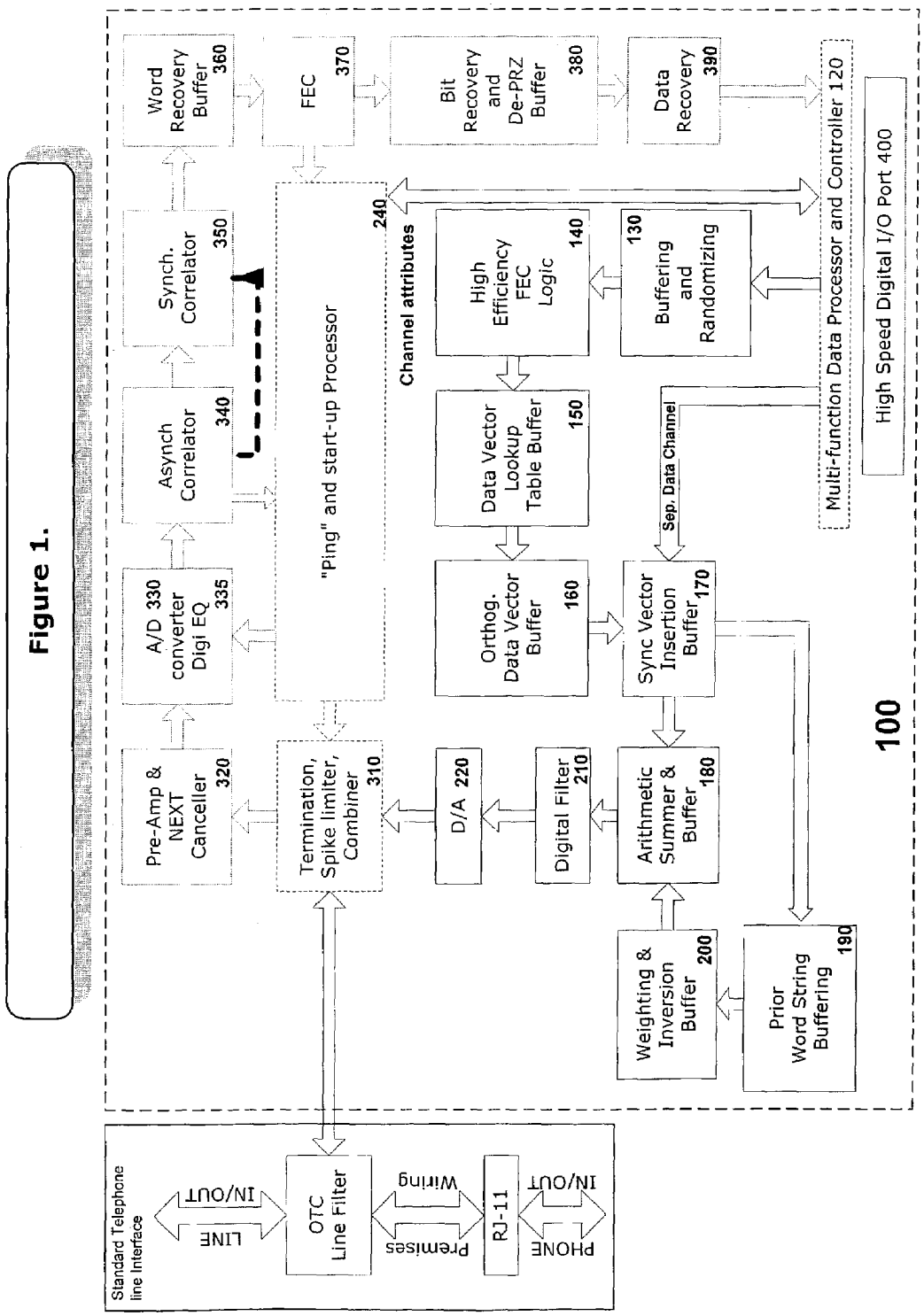
FIG. 1 is a block diagram of an exemplary transceiver in accordance with an embodiment of the present invention.

In accordance with an embodiment of the present invention, the DTMD system and method combines an inventive signal treatment method with a specific channel perspective, i.e., dealing with the channel as a transmission medium. It measures the channel's transmission parameters as viewed from the "end of the line" and then uses these numerics at the signal source to alter the shape of the basic signal structure such that when received at the far end, it will have maximum recognition attributes against interferers, noise, and attenuation. This reflexive methodology of the inventive DTMD system and method enables the service provider to set a maximum allowable data rate within the subscribed levels of performance (the LoS or Level of Service) and to add adaptivity to line conditions in response to the QoS or Quality of Service. It is appreciated that the performance metrics can include but are not limited to bi-directional data rates, time-measured QoS, etc. The signal treatment method of the present invention is a unique encoding of binary source data into a uniquely configured analog waveform, which will be discussed in detail herein.

In accordance with an embodiment of the present invention, the DTMD system comprises a pair of codecs (encoder/decoders), each being a transceiver. It is appreciated that the inventive DTMD system supports a broad range of CPE codec modules or transceiver, thereby enabling the customers seamlessly upgrade their transceivers. This is a byproduct of the DTMD system's ability to adapt to varying data rates. When a particular signal path is evaluated to determine the optimal parameters, one codec is designated as the transmitter and the other codec as the receiver. Since the DTMD system and method provides higher data rates than Ethernet and various forms of DSL, the number of high bandwidth broadband service offerings will likely increase, thereby elevating the need for secure transmission of data, including sensitive data such as customer information, payment information (i.e., credit, debit, or smart card information), financial information, medical information, etc. In addition, the integrity of the data traveling in both directions requires a safe and efficient data coding mechanism. Accordingly, the DTMD method and system provides content protection, configuration security, watermarking and data Forward Error Correction (FEC) Coding by any conventional means to attain enhanced data protection for secure and reliable transmission of data.

In accordance with an embodiment of the present invention, the DTMD system and method encodes a stream of pseudo-randomized and FEC-protected data into DTMD pulse shapes (waveforms) formed by spectrally filtering the analog summation of n×m different, orthogonalized code vectors of chip length "p", where "m" is the total number of data segments of length "n" that are sent simultaneously in the data frame interval and "n×m" is also the number of analog summations in each data frame interval. In accordance with an aspect of the present invention, the data is randomized using a process that has spectral attributes of amplitude levels of low frequencies below 4 kHz at −80 dB below the mid-band amplitude value and no tonal frequencies to disturb radios and other devices sensitive to tonals. Each treated data bit summons a surrogate pattern (or itself an M-ary level coded waveshape, i.e., number set or vector) of chip length "p." "N×m" of these waveforms are summed to form an M-ary level composite number set that when plotted as step values resembles a "crankshaft" profile to convey "m" times the data without a carrier. The "ortho" vectors are selected from a uniquely composed vocabulary or table of orthogonal and quasi-orthogonal vectors or words that has been established to provide a best fit for several properties. In accordance with an embodiment of the present invention, a point-to-point guided media application, the DTMD system and method can use the following ten properties or "Ten Rules" to generate the vocabulary or table of quasi-orthogonal words.

1. Maximum variable data throughput bi-directionally over the link,

2. Adaptable data rates per channel depending on line conditions and adjacent services, 3. Special Spectral pre-treatment (to minimize self crosstalk noise both from NEXT (near end cross-talk) and FEXT (far end cross-talk), and interference with radio services) and to maximize frequency use (density) and recoverability due to line non-flatness and non-coherent interference, 4. Orthogonal and quasi-orthogonal codes used in combination, 5. Correlability using SYNC code detection to locate a priori the best DATA correlation position, 6. Noninterference with POTS (Plain Old Telephone Service), e.g., lack of low frequency generation and ease of low frequency filtering without damage to the DTMD waveforms, 7. Self-Synchronization allowing for intrinsic clock recovery at the receiving end with embedded sync-based "data channel" for low rate communications and superframe encoding using a framing code, 8. Acceptable raw Bit Error Rates to allow for the FEC to correct to 10 exp-12 or better with minimum overhead and data retransmissions, 9. Minimal DC value (digital sum variation) and minimum amplitude distribution for maximum transmission power, 10. Use of almost exclusively binary logic or simple arithmetic so that the DTMD system is not dependent on complex and expensive digital signal processing (DSP) technology in terms of cost and power.

Since the DTMD system and method generates different types of waveforms than the current frequency based DSL methods, it can send multiple signals "up" and "down" the same media (or "upstream" and "downstream") by dynamically sharing of the maximum available data rates in each direction. It is appreciated that "down" or "downstream" means data or signal traveling from the central office to the customer premise equipment (CPE) over the existing Telco wire and "up" or "upstream" is the converse. In accordance with an embodiment of the present invention, the DTMD system and method uses a pseudo-randomized, variable time division multiplex (TDM) method to intersperse selectable data rate transmissions (such as full National Television Standards Committee (NTSC) bandwidth video) "up" the wire. That is, instead of assigning a fixed or dedicated time slot as with the standard time division multiplex method, the DTMD system and method assigns a pseudo-random time slot, i.e., it randomizes the time slots in accordance with a known but private sequence. This serves to whiten the spectrum, eliminate frequency tonal artifacts, and add another element of encryption-grade security to the system. By dynamically and adaptively selecting the waveform (i.e., "variable pulse shaping") as a function of the variable media conditions, specific media type and application, the DTMD system is easier to install and provision, and less costly than the current DSL systems. The DTMD system is easier and less costly to install because the DTMD system requires significantly less line selection and optimization due to its adaptivity. The DTMD system is easier and less costly to provision since all transceivers cover a large range of data rates with very fine granularity in available data rates and the number of different units in an inventory to be serviced is about 2–3 compared to 10 for the current DSL systems. Also, the DTMD system can dynamically adapt to the varying line conditions with near real time response.

These DTDM orthogonalized vectors have mathematical properties that are repeatable, and discernable in a field of noise, cross-talk and extraneous non-coherent signals. The orthogonality of component vectors and the white spread-spectrum of the composite DTMD output waveform when using a correlation detector, force all the interferers into the noise and the noise does not correlate with the vector values. The vectors that are summed to form the final waveform (crankshaft) are from a known table of values. Accordingly, signal generation in the DTMD system is highly predictable and not subject to amplitude and phase variations common in carrier modulated systems, such as DSL. In accordance with an embodiment of the present invention, the transceiver rejects signals that are not of a compatible structure. The DTMD waveforms also have a low signal-energy power spectral density and therefore do not interfere with other radio signals present within the same bandwidths unlike the current DSL systems. In accordance with an embodiment of the present invention, the DTMD system and method comprises a "variable pulse shaping" method, which randomizes the data based on at least one of the following: data bit, frame location, and clock rate. The vocabulary word order can also be pseudo-randomized.

The basic wire line (e.g., telephone plant) has a slow down-sloping amplitude response with increasing frequency. This results in a lower signal level as the upper limit of signal frequency bandwidth increases. In order to maximize the signal energy content over the broadband for best detection, in accordance with an embodiment of the present invention, the DTMD system and method uses a spectral pre-emphasis or counter-tilt combined with an inverse phase conditioning. The DTMD system and method use up-sloping amplitude vs. frequency characteristics to compensate for some of the wire's inherent droop. By elevating the signal level, the DTMD system and method impress a higher signal level within the bounds set by the FCC and American National Standards Institute (ANSI). The wire line droop parameters can be determined from measuring the wire line's response to a measurement pulse train with known phase characteristics. Since the input digital data is "spread" over the entire broadband, the signals are therefore more tolerant to amplitude aberrations over the frequency band (such as from bridged taps) that play havoc with techniques utilized in DSL and other frequency domain-based signal structures.

At the receiver end, there is a variable bandwidth, i.e., adaptive, equalizer to significantly "flatten" the line response. The transmitter at the central office measures the amplitude and phase shift vs. frequency characteristics based on a "ping" or test tone that the CPE (Customer Premises Equipment) generates at the beginning of a session. This defines the upper band-edge and the maximum data rate for the session. Since the DTMD system tracks various analog measurements, such as the ratio of "down to up" data rates, the subscribed data rates and the nature of the source data packets flowing, to ensure that proper security protections are invoked and appropriate variable FEC parameters are set, the DTMD system can be used in a pay-per-use-for-content billing system. The DTMD system has access to all the information to control the Level of Service, and allow or block pay-per-use-for-content types of data.

The transmitter inverts the phase profile and applies the invented phase profile along with an amount of amplitude "up-tilt" to a digital pre-emphasizing filter to allow for better recognition of the transmitted data signals when received by the receiver. The transmitter uses the maximum frequency value calculated at its end to compute the maximum data rate throughput and clock values for that specific line at that time. This process is repeated from time to time to "re-train" the DTMD transceiver pair for optimal performance over that specific wire line or guided media. The desirable byproduct of this process is that clock rates and therefore the wire line signal structures are different (and hence not correlatable) for DTMD customers using adjacent wire locations in a Telco Wireline bundle. These bundles of wires comprise typically 24, or more, twisted pairs. In accordance with an embodiment of the present invention, this process is repeated for the return transmission from the CPE to the central office since the wire line may perform differently or have different characteristics in the opposite direction, in order to further optimize the DTMD system. This can occur under usual and unusual line conditions.

The receiver has an array of correlation detectors (asynchronous correlator "Clock Recovery" 340 and synchronous correlator "De-Orthogonalizing Bank" 350 in FIG. 1) that look for "legitimate" data patterns or vectors in the incoming ensemble signal by using a de-orthogonalization process. As discussed herein, each legitimate signal was generated with an orthogonal-type vector that was selected based on the Ten Rules to provide optimal transmission over the signal path. The receiver detects the legitimate signal by correlating the ensemble signal against the same orthogonal-type vector surrogate assigned to a given data value and the data emerges after a maximum-likelihood estimation of the correlation output. This raw data is then sent to a forward error corrector (FEC) 370 of the transceiver 100 located at the central office to remove any errors introduced during the transmission process. Once the digital data blocks are individually recovered, the receiver reassembles the digital data blocks into a contiguous data stream. The contiguous data stream is then de-randomized in the buffer 380 and formatted in the data recovery buffer 390. The data and control processor 120 outputs the formatted data to an output of either the CPE or CO-based data port.

In accordance with an embodiment of the present invention, the DTMD system and method produces a Time Domain, nearly uniform bandwidth-density, wideband signal structure tolerant to non-coherent ingress, NEXT/FEXT, line amplitude notches from bridged taps, low per-Hertz power spectral density to minimize interference with terrestrial radio, etc. As an example, DSL signals are all on the same frequencies and hence "cross-talk" into each other on adjacent wires.

In accordance with an embodiment of the present invention, since the DTMD system and method is primarily a logic-based design as opposed to a more energy consumptive arithmetic unit-based design of the current broadband systems, the inventive DTMD system and method enables the Telcos to significantly increase their port density at the central office. Also, the inventive DTMD system can be built using emerging chipsets requiring less power.

Figure 6:
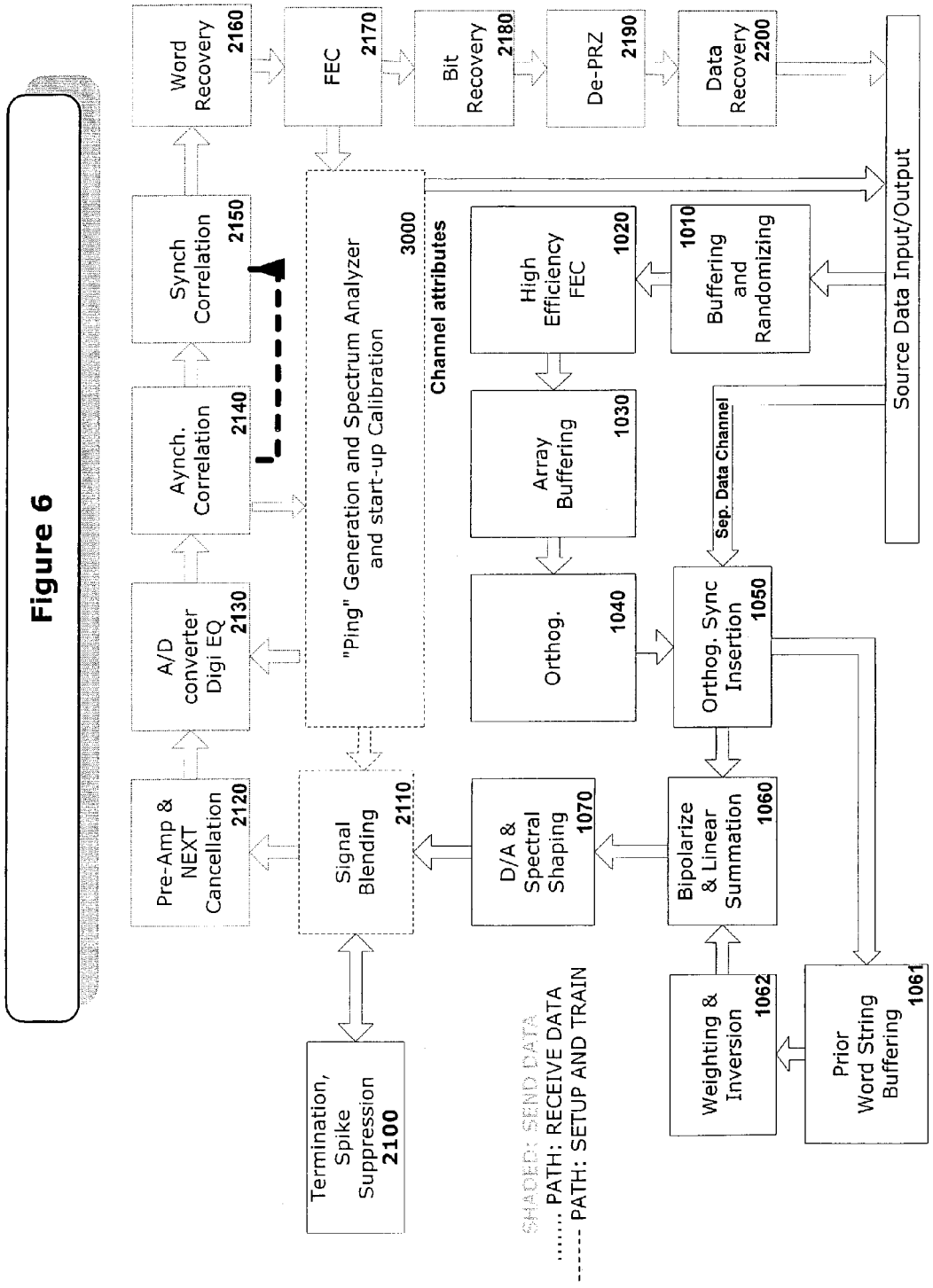
FIG. 6 is an exemplary flow diagram describing the operation of the transceiver in accordance with an embodiment of the present invention.

In accordance with an embodiment of the present invention, a transceiver 100 operating in transmitting mode (or a transmitter 110) generates a Time Domain signal structure by using spreading/enciphering codes and M-ary level orthogonal vectors of length "p" to exploit the amplitude degree of freedom to form the "crankshaft" waveform, see FIG. 6. This allows the DTMD system to transmit more bits/Hz, "m", than is commonplace. Turning now to FIG. 6, $X_1(t)$ is the amplitude level as a function of time, and "$T_s$" is the size of the step or "journal" in the crankshaft. "$T_s$"=m/the input data rate in seconds. Other wide band systems (or Broadband as they are referred to in other applications like radar, sonar and covert communications) presume a flat transmission characteristic with frequency and most often a media spectral allocation that has more bandwidth than the individual signal. In other words, they have the luxury of bandwidth. In the Telco twisted wire line pair, the frequency bandwidth is limited so the signal communication challenge is the pushing of more bits under the constraint of that specific dimensional (BW) limit.

Turning now to FIG. 1, there is illustrated a block diagram of an exemplary transceiver 100 in accordance with an embodiment of the present invention. The transceiver 100 can be located at the central office (CO) of a phone company (such as Telco), a repeater substation or at the customer premises. It is appreciated that since the CO-transceiver and CPE-transceiver are nearly identical and share many of the components, accordingly the transceivers can be built with the same core chips. Although, the FIG. 1 depicts a transceiver of the inventive DTMD system and method in a wire line application, it is appreciated that the transceiver 100 of the present invention can be used in any guided media applications, including but not limited to RF, coax, etc. It is appreciated that the transceiver 100 at either end of the wire line functions as both a transmitter 110 and a receiver 300. The transmitter 110 of the transceiver 100 comprises a data and control processor 120, a line quality "ping" and start-up (or ping and start-up) processor 240, a randomizing buffer 130 to store and randomize the input data stream, an FEC 140, a look-up table ('vocabulary") 150, an "orthogonalizing" buffer 160 to hold the selected vectors, a sync vector insertion buffer 170, an arithmetic summer and numeric value replicator 180, a memory 190 to store time-weighted values of the last generated words, an arithmetic buffer 200 to impose amplitude weights to send to the arithmetic summer 180, a filter 210 (preferably, a digital filter 210), and a digital to analog (D/A) converter 220. Although not shown, it is appreciated that the transceiver 100 can function solely as a transmitter 110 or a receiver 300. That is, the transceiver 100 may comprise only components related to the transmitter 110 or the receiver 300.

The ping and start-up processor 240 generates a ping or test signal to determine and profile the quality of the line, e.g., noisy channel, etc. The ping and start-up processor profiles the line ("line profiling") to set initial maximum data rate and equalizer coefficients. Also, the ping and start-up processor 240 adjusts the clock rate for each customer in frequency and/or phase so that they have the maximum non-coherence to each other's clock in a given bundle and adjacent central office card. The ping and start-up processor 240 uses a bipolar doublet function, rich in harmonics, all with the same "0 degree" phase angle to generate a wideband signal to measure and phase characteristics of the media or line, thereby enabling the ping and start-up processor to establish initial maximum LoS. The bi-polar doublet function enables the ping and start-up processor 240 to generate a ping signal that has no dc content and which can cover the entire spectrum at once. The ping and start-up processor of the transceiver 100) at the central office (or referred to herein as the CO-transceiver) analyzes the test or ping signal for its bandwidth content, phase response and the effective initial SNR. These values are communicated using the DTMD signaling scheme to transmit coefficients and other setup data between the transceiver located within the central office and the CPE. Once the DTMD system is operational after initialization, QoS "tweaking"/retraining is done using the DTMD sync word or separate data channel.

In accordance with an embodiment of the present invention, the line qualifying ping and start-up processor 240 generates a line-qualifying signal pulse with a controlled and known shape, rich in spectral harmonics and known phasing of the harmonics. The line qualifying ping and start-up processor 240 uses this line-qualifying signal pulse to determine the amplitude and phase characteristics of the line in each direction. The maximum compensatable frequency of the session is determined within the limits of the noise figure of the pre-amp. This establishes the Bandwidth factor in the Shannon Theorem, as discussed herein. The line qualifying ping and start-up processor 240 measures the overall noise spectrum for the line. This sets the signal to noise ratio (SNR) factor in the Shannon Theorem and hence the multiplier of the BW to establish the initial operating data rate. As discussed herein, this rate factor is used to set up the number of orthogonal waveforms needed to form the "crankshaft."

The data and control processor 120 comprises the master timing, control and interfaces to the central office or the customer's external equipment such as computers, TV monitors, peripherals, etc. In accordance with an embodiment of the present invention, the data and control processor 120 performs security processing (including but not limited to identification and authentication, credit card reader, biometrics, etc.) for transactions, LoS, QoS, system performance metrics or information transmitted between the transceivers 100 located within the central office and CPE, as well as other higher-level system information. In accordance with an aspect of the present invention, the data and control processor 120 comprises an embedded CPU level security chipset to block unauthorized use of the CPE units for theft of service.

Figure 3:
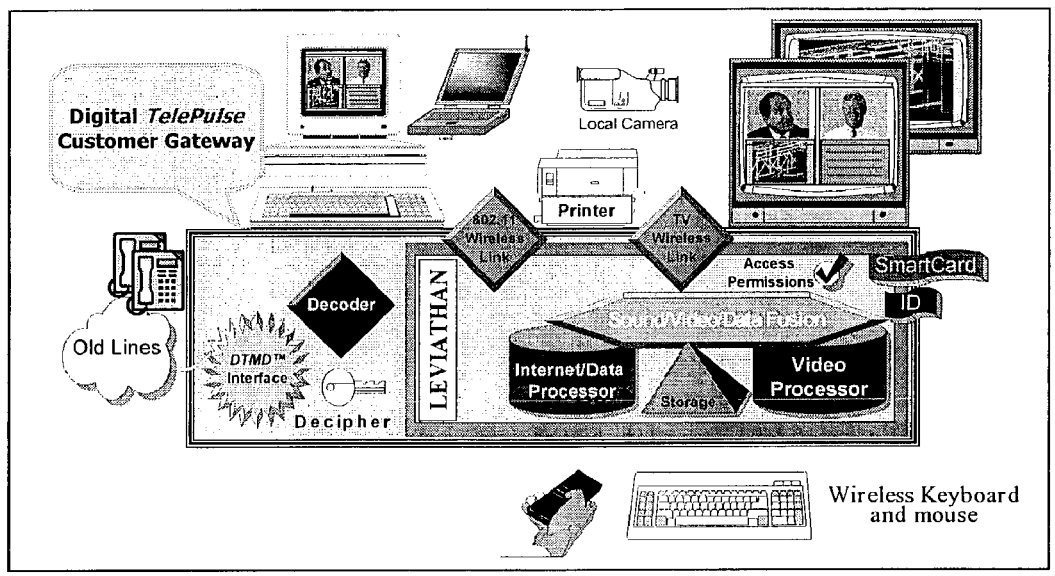
FIG. 3 is a diagram of an exemplary CPE gateway in accordance with an embodiment of the present invention.
Figure 4:
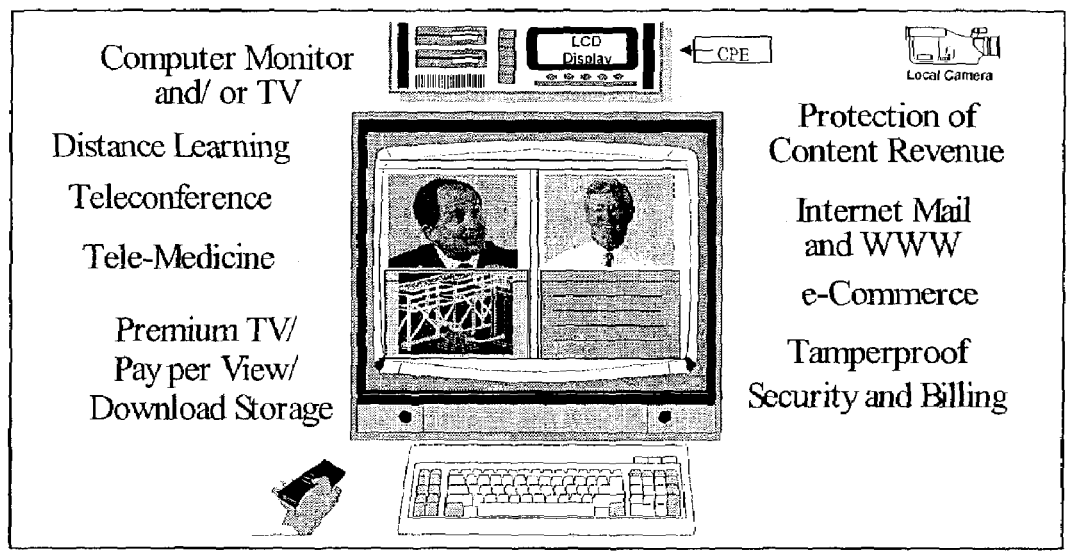
FIG. 4 is an exemplary screen shot of a broadband service utilizing the DTMD system of the present invention.
Figure 5:
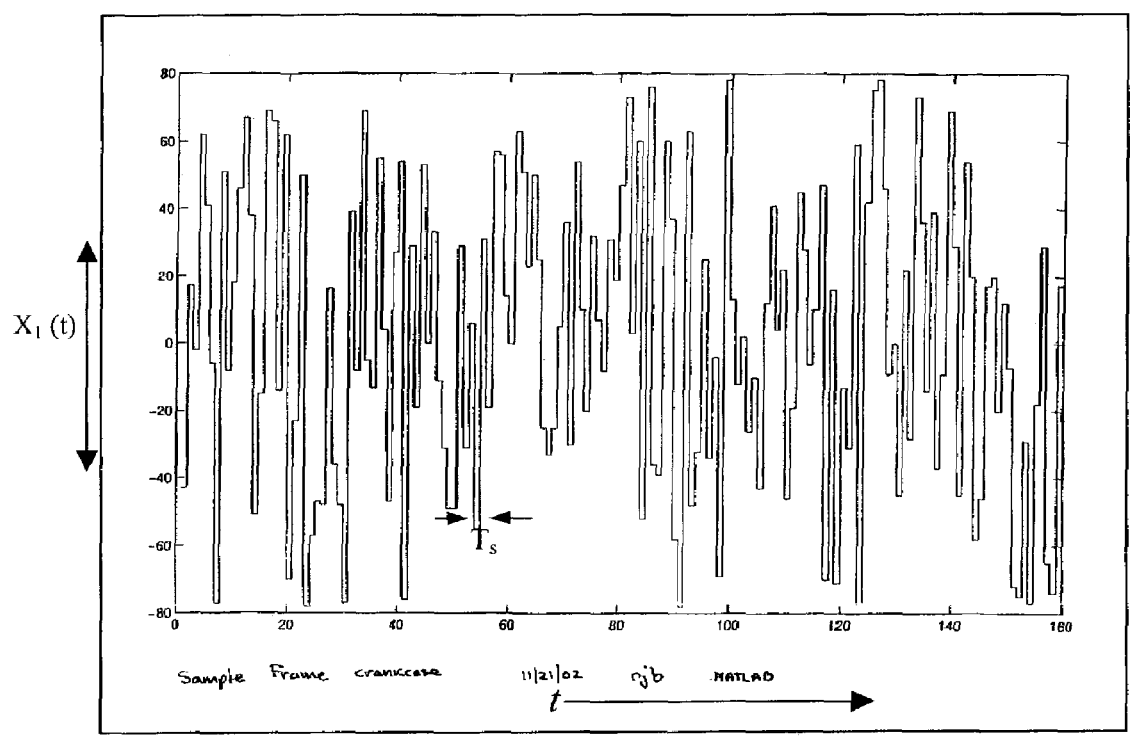
FIG. 5 is an exemplary rendering of "Crankshaft" profile.

In accordance with an embodiment of the present invention, the transceiver 100 for use in the CPE unit can be used a multifunction gateway, as shown in FIG. 3. The multifunction gateway can comprise printer, IR, wireless, camera, computer, TV and accessory ports, and the intrinsic capability to serve as a self contained computer and TV signal capture, time-delay device and pay-per-use controller. The wireless links can support extra computers and TVs for multiple simultaneous video and Internet events. The system supports combined Internet and video on the same screen as well as interactive modes for video and gaming. The embedded CPU-level security device protects downloaded content from being copied and redistributed over the web as digital content. There is an FEC to protect the integrity of the data stream from communication errors as well as an optional Secure Digest function that embeds a code in the protected data streams so that copying can be traced. In accordance with an aspect of the present invention, the multifunction gateway provides protection of copyrighted movie and sound content by denying the use of the computer as a display device for this type of material and restricting its use only to the TV. For example, in accordance with an embodiment of the present invention, the ping and start-up processor 240 can inhibit the transceiver 100 from sending content-protected video related signals over the Ethernet, Bluetooth, or 802.11 ports, thereby preventing a computer but not a TV from receiving such video. A sample graphic presentation as on a TV screen of a mode that could be a videoconference, an interactive classroom or a real time, high quality distance learning session is shown in FIG. 5. Although, some of the features of the multifunction gateway are currently available in Web TV, TiVo and DSL/Cable modems, none of these existing units provide all of the features of the multifunction gateway. The capabilities of the inventive DTMD system and method enables all of the features to be combined into one unit (i.e., the multifunction gateway of the present invention).

The process of encoding the input data stream for transmissions by the transmitter 110 (or the transceiver 100 operating in a transmitting mode) is now described in conjunction with process or flow diagram of FIG. 6. The data and control processor 120 captures a block of data from a data stream received from an input source. The input source includes but is not limited to any binary data stream containing computer file, video or audio file data and the like. The data and control processor 120 stores this block of data in a buffer 130, such as a serial or first-in first-out (FIFO) buffer at step 1010. Also, the buffer 130 performs a boolean logic "exclusive or" on this stored data with a known pseudo-random coding sequence to lower the potential DC content and whiten the data spectrum, thereby eliminating periodic artifacts or tonals in the frequency spectrum prior to FEC and orthogonalization without affecting the data rate of the data stream at step 1010. In accordance with an embodiment of the present invention, the buffer 130 selects pseudo-random codes that have very low amplitudes (−60 db or better relative to the channel's mid-band value measured on a 1 Hz basis, of low-frequency (below 6 kHz)) energy to aid in the plain old telephone service (POTS) filtering process. These randomizing codes immunizes the signals from wire line irregularities by spreading the signal energy across the whole band as evenly as possible to avoid DC content by their composite summation having no average DC value. Accordingly, the coding sequence should have lower spectral power in the low frequency range below 40 kHz and should be totally flat spectrally. Many coding sequences are possible and can be used. One such coding sequence can have a repetition time of at least 100 frames and every time it starts "over", it begins in a pre-determinable and different spot. In accordance with an embodiment of the present invention, the buffer 130 comprises pseudo-randomizing buffer matrices which can act as interleave buffers for the FEC 140 by spreading line errors across individual FEC block boundaries.

After the data has been pseudo-randomized, a forward error corrector (FEC) 140, preferably a high efficiency FEC, process the pseudo-randomized data stream through a predetermined algorithm or code that adds a small overhead of additional data bits (or "correction bits") to allow for downstream correction at step 1020. Preferably, the FEC 140 will add only about fourteen percent (14%) overhead to the data stream. If the transmission is received in error, the receiver uses the correction bits to check and repair any error in the received data stream. The data and control processor 120 selects the predetermined code table having a variable segment or cell size ("m") based on the transmission conditions of the wire line, such as the QoS signals from the receiving end (or the receiver 300). In accordance with an embodiment of the present invention, the data and control processor 120 dynamically or periodically adjusts the number of codes to account for any changes in the transmission characteristics or conditions of the wire line. Hence the FEC 140 can use an adaptable and variable frame length to accept higher raw bit error rates, thereby operating closer to the Shannon "limit". The data and control processor 120 can also adjust the maximum clock rate being used in the channel as a vernier between "m" increments. The start-up processor 240 performs line quality "ping" test to determine the initial maximum clock rate of the channel. The FEC 140 of the present invention can accept a 10 exp-4 BER (bit error rate) signal and make it 10exp-14 or better for a random noise distribution of errors based on the well known Reed-Solomon FEC correction. The FEC 140 handles the small burst errors directly within the FEC frames and spreads larger errors over many frames using any of the known interleaving techniques. The amount of interleaving is proportional to the size of the burst. For example, if the burst is three data frames long, then the number of interleaves is equal to three times the number of bits in a frame (n×m or 160 bits in the example set forth herein) divided by the bit error correction capacity of an FEC frame "k," which is typically equal to eight. This results in sixty interleaves or sixty data frames.

The data and control processor 120 arrays the forward error corrected and pseudo-randomized data stream using conventional framing means to form a DTMD frame, such as an example shown in Table 1, at step 1030. The total number of bits in the array (or matrix) is (n×m) where there are m segments or cells, each segment in the array being n-bits long. The number of segments (or m) is a function of the Shannon multiplier. For example, if the effective broadband signal-to-noise ratio (SNR) in decibels is 36 dB, then this translates to SNR of about 4000:1 (where SNR=$10^{(db/10)}$). In order to determine the various relevant parameters to obtain the optimum data rate, one can utilize the Shannon Theorem. The Shannon Theorem is well known to one skilled in the art and it specifies the maximum data rate that is achievable in presence of noise. The Shannon formula can be basically expressed as follows: Bandwidth Efficiency=Bandwidth ($Log_2$ (1+SNR)) where the log component (or $Log_2$ (1+SNR)) is commonly referred to as the limiting Shannon multiplier. That is, the Shannon multiplier times the Bandwidth represents the total number of data bits that can pass through the channel or signal path. Based on the Shannon formula, then the Shannon multiplier is about 12 for a channel having SNR of 36 dB. Accordingly, if the effective broadband signal-to-noise ratio is 36 dB, then the data and control processor 120 can form a DTMD frame array having 12 rows or segments because the maximum number of data bits that can be transmitted in this channel is 12 times the Bandwidth based on the Shannon Theorem. Table 1 represents an exemplary data word table or vocabulary stored in the look-up table 150 for a specific case where n=16 and m=10 (where 160 input data bits are framed into a 16×10 array). It is appreciated that in this example, values above m=10 is not used, as described herein. All bits in rows 11–16 are moved to the next frame.

TABLE 1

PFZ'd and FED'd Data Word Table

| | n → | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 1 | 1 | 0 | 1 | 0 | 1 | 1 | 1 | 0 | 1 | 0 | 1 | 1 | 0 | 0 | 1 | 1 |
| 2 | 0 | 1 | 0 | 1 | 1 | 1 | 0 | 1 | 0 | 1 | 1 | 0 | 0 | 1 | 1 | 0 |
| 3 | 1 | 1 | 0 | 0 | 1 | 0 | 1 | 1 | 1 | 0 | 1 | 0 | 1 | 0 | 1 | 1 |
| 4 | 0 | 1 | 0 | 1 | 1 | 1 | 0 | 1 | 1 | 1 | 0 | 1 | 0 | 1 | 0 | 1 |
| 5 | 0 | 1 | 0 | 1 | 0 | 1 | 1 | 1 | 0 | 1 | 0 | 1 | 0 | 1 | 1 | 0 |
| 6 | 0 | 1 | 0 | 1 | 0 | 1 | 0 | 1 | 1 | 1 | 0 | 1 | 1 | 0 | 1 | 0 |
| 7 | 0 | 1 | 0 | 1 | 1 | 0 | 1 | 0 | 1 | 1 | 1 | 0 | 1 | 1 | 0 | 1 |
| 8 | 1 | 0 | 1 | 0 | 1 | 1 | 0 | 1 | 0 | 1 | 1 | 1 | 0 | 1 | 1 | 0 |
| 9 | 1 | 0 | 1 | 0 | 1 | 0 | 1 | 0 | 1 | 1 | 1 | 0 | 1 | 1 | 0 | 1 |
| 10 | 1 | 0 | 1 | 0 | 1 | 1 | 1 | 1 | 0 | 1 | 0 | 1 | 1 | 1 | 0 | 1 |
| 11 | 1 | 0 | 1 | 0 | 1 | 0 | 0 | 0 | 1 | 0 | 1 | 1 | 1 | 0 | 1 | 1 |
| 12 | 1 | 1 | 1 | 0 | 0 | 1 | 0 | 1 | 1 | 0 | 1 | 0 | 1 | 1 | 1 | 0 |
| 13 | 0 | 1 | 0 | 1 | 0 | 1 | 0 | 1 | 1 | 1 | 1 | 0 | 1 | 1 | 0 | 1 |
| 14 | 1 | 0 | 1 | 0 | 0 | 1 | 0 | 1 | 0 | 1 | 1 | 1 | 1 | 0 | 1 | 0 |
| 15 | 1 | 1 | 1 | 0 | 1 | 0 | 1 | 0 | 1 | 1 | 0 | 1 | 1 | 1 | 1 | 0 |
| 16 | 0 | 0 | 0 | 0 | 0 | 0 | 1 | 1 | 1 | 0 | 1 | 1 | 0 | 1 | 0 | 0 | 1 |

TABLE 2

Column 1 Ortho-Vector Assignment

| Row | Column 1 Bit value | Ortho-Vector |
|---|---|---|
| 1 | 1 | $p_1a$ or $p_1b$ |
| 2 | 0 | $p_{17}a$ or $p_{17}b$ |
| 3 | 1 | $p_{33}a$ or $p_{33}b$ |
| 4 | 0 | $p_{49}a$ or $p_{49}b$ |
| 5 | 0 | $p_{65}a$ or $p_{65}b$ |
| 6 | 0 | $p_{81}a$ or $p_{81}b$ |
| 7 | 0 | $p_{97}a$ or $p_7b$ |
| 8 | 1 | $p_{113}a$ or $p_{113}b$ |
| 9 | 1 | $p_{129}a$ or $p_{129}b$ |
| 10 | 1 | $p_{145}a$ or $p_{145}b$ |
| 11 | 1 | |
| 12 | 1 | |
| 13 | 0 | |
| 14 | 1 | |
| 15 | 1 | |
| 16 | 0 | |

For example, if a signal path or channel has a bandwidth of 2 MHz, then maximum data rate allowed (which is commonly referred to as the Shannon limit) is 20 Mbits per second based on the Shannon Theorem. However, prudence dictates that the DTMD system operate at levels below the maximum data rate to provide a safety margin to ensure the robustness of the system. In accordance with an embodiment of the present invention, the data and control processor 120 selects "m" which is less than the Shannon multiplier to ensure that the present system operates below the Shannon limit. For simplicity m=10 is used as an example to describe various aspect of the present invention herein. Accordingly, as delineated in Table 1, the DTMD system can send all m=10 segments at the same time and operate well within the Shannon limit.

After the data stream is framed, the orthogonalizing buffer 160 orthogonalizes the data bits of the DTMD frame using any conventional means to ensure that the data is recoverable at the receiving end at step 1040. If the data is not orthogonalized, the receiver could not recover the data even though the received data or waveform has the same "crankshaft" appearance as the orthogonalized data. Data variables that are added require a number of simultaneous equations equal to the number of variables in a linear system in order to be recovered. If the variables are independent (or orthogonal) they can be separated by classical correlation. Alternatively, unless the data bits are orthogonalized, the inventive DTMD system could compact the data by "m" times. The number of amplitude levels that can be recognized is limited by the dynamic range. The dynamic range is simply the SNR (36 dB in this example) plus the processing gain for a vector length of "p." For simplicity in this example, the vector length "p" can be set to the nearest byte value, but it does not have to be. It can be any number or chosen based on the "Ten Rules" to minimize the overhead. However, the vector length "p" has to be big enough to allow for enough vectors to be selected. If p is too small then there are not enough vectors. If p is too large, there will be longer vectors (more numerical values) in a frame which can slow down the output data rate into the wire line. The processing gain is defined as $10 \log_{10}$(vector length) or 12 dB, thereby yielding a dynamic range of 48 dB. Each bit of amplitude resolution represents a doubling of value $20 \log_{10}$ (ratio of 2:1)=6 db roughly. According, there are 8 doublings of value to reach 48 db. Alternatively, one can convert 48 db to a ratio which is first done by (10 exp (48/20)) or 10 exp2.4=251.2 and then determine how many doublings (bits) which is $\text{Log}_2$ (251.2) or 7.97 or "8" for simplicity. The amplitude resolution of 8 bits yields 2exp8 amplitude levels, which is greater than 160 data bits (16×10 array in this example) That is, within 8 doublings, there are 2exp8 possible numbers or 256. Accordingly, 160 levels or number values lie within the 256 possible levels.

Each cell in the n×m array or DTMD frame invoke a specific quasi-orthogonal vector of length "p" according to its location in the orthogonalizing buffer 160. That is, associated with every data bit in Table 1 is a quasi-orthogonal word or vector p#a for data bit having a value of "0" and p#b for data bit having a value of "1". Table 2 delineates an exemplary list of selected orthogonal vectors (words) for the data bits in column 1 of Table 1. The selected orthogonal vectors are stored in the orthogonalizing buffer 160. The length "p" of the orthogonal vectors or words is determined based on the Ten Rules. The minimum number of orthogonal words required is defined by twice the number of elements or data bits in the frame (i.e., frame size), one orthogonal vector for "0" value data bit and another vector for "1" value data bit. Accordingly, for frame size of 160 data bits, 320 different orthogonal vectors or words are required since each data bit requires a pair of orthogonal vectors. For example, if p=16, then the DTMD system and method selects 320 different orthogonal vectors or words from 65,536 ($2^p$) possible vectors for a given frame or block of time. The result is that each bit requires p "chips" to be expressed. It is appreciated that "chips" is a general term for "bits" or values when used in spreading codes. If 160 data bits need to be represented, then we need 160 surrogates. As indicated herein, there must be enough of these vectors (surrogates) in the field of $2^p$ to represent 160 data bits. Hence a vocabulary or table for a group of orthogonal vectors (ortho-vectors), such as for 160, are stored in the look-up table 150 having values ranging from ($p_1a$ or $p_1b$) to ($p_{160}a$ or $p_{160}b$). These vectors are selectively "withdrawn and held" in the orthogonalizing buffer 160 to orthogonalize the data bits.

In order to protect and multiply the number of bits during transmission, DTMD has to assign a special orthogonal code to each bit in the frame or array. The orthogonal code length "p" is determined to best fit the "Ten Rules." The Ten Rules are used to guide the selection of codes with detectability in application defined noise environment being the basic guidance. It is appreciated that the class of application and the specific instance of codec-wire line combination will determine the appropriate vocabulary. However the minimum number of orthogonal words required is defined by having one orthogonal vector (or ortho-vector) for "0" value and another for "1" value for each element in the frame. We would then need 160 pairs (320 different a and b codes) out of a possible 65,536 (for p=16) to choose from for a given frame or block of time. The result is that each bit now takes p "chips" to be expressed. The vocabulary for a group of, for example, 160 Ortho-vectors is kept in a separate table with values from ($p_1a$ or $p_1b$) to ($p_{160}a$ or $p_{160}b$).

TABLE 3

Column 16 Ortho-Vector Assignment

| Row | Column 16 Bit value | Ortho-Vector |
| --- | --- | --- |
| 1 | 1 | $p_{16}a$ or $p_{16}b$ |
| 2 | 0 | $p_{32}a$ or $p_{32}b$ |
| 3 | 1 | $p_{48}a$ or $p_{48}b$ |
| 4 | 1 | $p_{64}a$ or $p_{64}b$ |
| 5 | 0 | $p_{80}a$ or $p_{80}b$ |
| 6 | 0 | $p_{96}a$ or $p_{96}b$ |
| 7 | 1 | $p_{112}a$ or $p_{112}b$ |
| 8 | 0 | $p_{128}a$ or $p_{128}b$ |
| 9 | 1 | $p_{144}a$ or $p_{144}b$ |
| 10 | 0 | $p_{160}a$ or $p_{160}b$ |
| 11 | | |
| 12 | | |
| 13 | | |
| 14 | | |
| 15 | | |
| 16 | | |

Turning now to FIG. 7, there is illustrated an exemplary ortho-vector cube or orthogonal vectors in a 3-D in accordance with an embodiment of the present invention where each data bit in the DTMD frame has been replaced with an orthogonal vector or word length "p". In example described herein, the ortho-vector cube has 160 orthogonal words to support the contents of Table 1, i.e., 160 data bits. FIG. 8 depicts an exemplary ortho-vector cube showing the data flow into and out of the cube in accordance with an embodiment of the present invention. The ortho-vectors $p_1$ to $p_{16}$ reside in the first row, $p_{17}$ to $p_{32}$ in the second row, etc. Tables 2 and 3 show examples of the ortho-vector assignments for data bits in columns 1 and 16 of the ortho-vector cube of FIG. 7, respectively, where "$p_{16}a$" is the ortho-vector selected for a binary value of "1" and "$p_{16}b$" for a binary value of "0" in row-1 and column-16.

In accordance with an embodiment of the present invention, the arithmetic summer 180 compacts all of these 160 orthogonal vectors (words) into a single data stream of 16 (or p-length) samples long in roughly the same time as "1/m times the input data (plus the added overhead bits) rate," where "m" is the compaction factor. To compact the orthogonal vectors into a single data stream, the data and control processor 120 operates on each n-m plane of the 3-D matrix at a time. Each plane carries an array of one of the "p" chips for each of 160 orthogonal words. These chips are later converted into a bipolar number and summed by the data and control processor 120 and the arithmetic summer 180, respectively. There will be n×m sums (e.g., 160 in the illustrated case) of individual chip numerical values, each chip having an amplitude range from "0" to (n×m) or "160 times the ortho-vector peak value". If a binary value are used in each chip, the cell the number range would be "0" to n×m×"1" or 160.

It is appreciated that the orthogonalization process generates p-times more bits than the number of bits in the input data stream. Although, this appears to generate an enormous overhead (or alternatively, cause large reduction in the data rate), the data undergoes additional processing where this apparent and significant overhead is reduced by the summation process in the arithmetic summer 180. The orthogonalization process is necessary to preserve the recoverability of the orthogonal words that will be subsequently linearly summed by the arithmetic summer 180, as described herein.

The number of required quasi-orthogonal words dictates the lower bound of length "p" and produces a required dynamic range of the channel based on the number of levels defined by "n×m" (i.e., the channel data rate). Therefore, the dynamic range constrains "n×m," and in turn "m" for a given value of "n". Hence, if the noise level in the channel decreases (or SNR increases), the data and control processor 120 can increase the value of parameters p and m by an integer value and utilizes a new vocabulary based on the new length "p" and new number of words (n×m). Of course, the data and control processor 120 can take inverse action for reduced SNR or when the noise level increases in the channel. In accordance with an embodiment of the present invention, the data and control processor 120 makes minor adjustments downward in the output clock rate for a given channel bandwidth if the QoS measurements, such as uncorrected error measurement, a value sent to processor 120 from the FEC 370 are increasing above the initially logged value during testing and start-up by the ping and start-up processor 240. Also, minor downward adjustments to the output clock rate will be made if the data and control processor 120 determines that the sync correlator 350 peak detection values are deteriorating below values predetermined for a specific application. These two measurements are sensitive and indicate the level noise in the channel and effectiveness of data recovery, thereby establishing the level of service attainable for that channel. That is in the full or half duplex mode, if the receiver 300 of the transceiver 100 detects drop-off in the line conditions, the transmitter 110 of the transceiver 100 makes the necessary adjustments to account for deteriorating line conditions. However, in the simplex mode, where the transceiver 100 operates solely as a transmitter 110, the transceiver 100 could not adapt to changing-line conditions unless the receiving end provides such information. Positive adjustments in output clock rate are a "fine tuning" of system performance directly with increased SNR and vice versa. Whereas, any changes to "m" and "p" are bulk step changes since increasing "m" by 1 results in about a 10% change in system performance. Either "p" and "m" changes or clock rate adjustments can be made depending on the application of the DTMD system. SNR is initially measured during set-up and tracked with QoS monitoring.

After the data has been orthogonalized, the data and control processor 120 denotes a sync pattern as one or two bit/word sequence(s) in each DTMD frame at step 1050. The data and control processor 120 selects orthogonal vectors or words as a pair of sync patterns (sync pair) that have the highest orthogonality and stores the selected sync pair in the sync vector insertion buffer 170. Sync pairs contain both a "1" and a "0" word. Each word is the 1's complement of each other. Depending on "p," there is a theoretical maximum on number of available sync patterns or words. For "p"=16, the number is 2. The data and control processor 120 at the receiving end can utilize this sync pair to realign the DTMD frames and solidify clock recovery. Since these sync vectors are "perfectly orthogonal," they can be found easily even in an asynchronous manner. When the data is received and A/D converted at for example, 8× the basis clock rate "r", all the numerical values, 128 of them per frame, are stored and marked as having a correlation position. As the ensemble is correlated against the sync words in the vocabulary, a new set of values emerges from the correlator. The peak output value is located as to where in the 128 data positions it occurred. This timing value is used in setting the location in the synchronous correlators for where the peak outputs of their detected words are likely to occur. Similarly, since the peak location of the sync word can be found, the frame start and stop locations can be also found by bracketing +/−64 locations on either "side" of the peak location. This data timing information is used by the receiver 300 to decode the received data. This process of sync evaluation and recovery is done continuously to assure consistent timing and performance. In accordance with an embodiment of the present invention, the DTMD system can utilize the sync words as a separate "virtual" or embedded data channel because each of the sync words has two values that are 1's complements of each other. The sync words are simply two locations in the n×m matrix. For example, the sync words can be the first and last "words" in the ortho-vector cube. Their positions are not absolute and can be made depending on the application. They have both a "1" or a "0" value word possibility. Thus there are 2 bit positions in the ortho-vector cube that are very robust and can be found at all times. The sync words can be used as an input data at a low rate. This hardened property allows for the separate transmission of 2 bits per frame from the data and control processor 120 to coordinate activities at each end (transmitting and receiving end) and send billing info, i.e., setup parameters, LoS changes, etc.

These sync words are then converted from individual amplitude levels to summed bi-polar levels or signals by any conventional means, such as the arithmetic summer 180, and in any order, thereby allowing for subsequent conversion to an analog style waveform with varying amplitude levels at step 1060. The data and control processor 120 converts each ortho-vector unipolar amplitude to bipolar value and supplies the bipolar values to the arithmetic summer 180. In accordance with an embodiment of the present invention, the arithmetic summer 180 linearly adds on a chip-by-chip basis from $p_1$ up to $p_{160}$ for each plane of the ortho-vector cube. The summation encompasses 160 of the first bits of the "p" ortho-vectors, each generating an amplitude value that can be thought of as a "virtual sample" of an analog multi-level waveform. FIG. 9 shows a summary of the data flow into the "crankshaft" or summation stage using for example, binary ortho-vectors. These amplitude values are then replicated up to 8 times by the arithmetic summer 180 to give granularity, thereby enabling the digital filter 210 to smooth the waveforms.

The bi-polarized summed signals have a maximum range of values between ±½A (n×m), where A is the maximum allowable peak-to-peak amplitude of the output signal. For example, if in building the vocabulary, the numerical values were a "1" or a "0", then the maximum summed values ranges from "0" to "160", for the exemplary 16×10 matrix. First, the numbers have to be offset by ½ of that range to make the resultant waveform bipolar (to avoid DC content).

Second, the absolute value of the output signal needs to be scaled into Volts, that is purpose of A. which is an adjusting multiplier to match to the media driver. The multi-digit values that are generated by the arithmetic summer 180 emerge at the fastest basic clock rate corresponding to the reciprocal of the upper frequency or band-edge of the wire line. Preferably, the clock rate is equal to or more than the input data clock rate plus an offset amount of 6–20% depending on the combined overhead of the FEC, pseudo-randomizer and sync patterns.

Alternatively, the data and control processor 120 performs additional processing before the sync words are bi-polarized and summed at step 1060. In accordance with an embodiment of the present invention, the data and control processor 120 reads or retrieves previously stored "r" frames of crankshaft values, where r can be an integer value such as 5, from the memory 190 at step 1061. As described herein, these crankshaft values are smoothed and output as crankshaft profile, as shown in FIG. 5. The data and control processor 120 generates a weighted sum of these retrieved crankshaft values using any known technique, such as time-weighted value of one or more previously generated words, and stores the weighted sum of the crankshaft values in the arithmetic buffer 200 at step 1062. The arithmetic summer 180 then subtracts the weighted sum from the current outgoing values (or the crankshaft values of the current sync words), thereby adjusting the amplitude levels of the sync words to lower the inter symbol interference (ISI). In accordance with an embodiment of the present invention, the data and control processor 120 performs the ISI compensation by adding inverted weighted replicas of prior frames without requiring any changes to the vocabulary of ortho-vectors.

The digital filter 210, such as an 8× oversampling digital filter, with specifically defined characteristics smoothes or spectrally shapes the resulting number set at step 1070. Additionally, the digital filter suppresses the "step" induced attributes of the signal. It is appreciated that the use of a digital filter enables the ping and start-up processor 240 to auto-track the processing rates and bandwidths with the clock rates. That is, the shape of the resulting number set stays the same regardless of clock rate, so it auto tracks with the internal clock, which is set to satisfy system processing rates and bandwidths. The digital filter 210 suppresses the Sinc sidelobes, reduces energy in the out of band area to avoid FCC regulation conflicts and assures no energy in the POTRS band. In accordance with an embodiment of the present invention, the digital filter 210 is a conventional FIR (finite impulse response) filter. The digital filter 210 digitally filters the signal or the analog multi-level waveform (i.e., the resulting number set) to remove any signal energy below 40 kHz to avoid the plain old telephone service (POTS) band. That is, the POTS guard band aspect of the FIR filter 210 is set to avoid interference with the POTS signals on the same telephone line by suppressing any residual DTMD energy in the low-end of the total spectrum. In accordance with an embodiment of the present invention, the high frequency aspect of the FIR filter 210 is configured to tailor "Sinc" (Sin(x)/x) function induced sidelobes to preserve detectability yet reduce egress into other channels and radio services (i.e., lowering power spectral density) outside the band of interest. That is, the digital filter 210 shapes the signal energy to tailor Sinc function upper sidelobes and pre-emphasizes the spectrum to maximize downstream detectability.

The amplitude conversion device 220, such as a D/A converter, converts the filtered resulting number set into an analog crankshaft waveform at step 1070. The number of amplitude bits "q" of the D/A converter 220 is defined by the channel's SNR and the spreading gain "p". The dynamic range of "q" of the D/A converter 220 in bits is equal to $1+\log_2(n \times m)$, rounded to the next highest integer. The D/A converter 220 presents the waveform output to the wire line interface circuit 230 for transmission. In accordance with an embodiment of the present invention, the output waveform resembles a bipolar "crankshaft" of pulse shapes. The D/A converter 220 inserts a special frame marker in the "crankshaft" once per frame to enable frame synchronization. Bit synchronization is recovered by the vernier positioning of the sync word with any difference in timing resulting in an adjustment of the clock rate at the receiving end. An embedded data stream that uses the frame sync words as a data channel provides the frequency information to set the receiver parameters. The output waveform is then smoothed (low-pass filtered) by the D/A 220 to reduce any residual switching transient interference and output to a wire line interface circuit, such as OTC line filter.

In accordance with an embodiment of the present invention, this crankshaft waveform can be also used to convey signaling once the DTMD system is up and operating. As shown in FIGS. 7 and 10, the signaling is at the frame rate and injected at the time sync pair are inserted into the DTMD frame at step 1050. Also, the synchronizing signal(s) embedded into the crankshaft waveform is a recoverable word, thereby enhancing the detectability of the quasi-orthogonal words.

In accordance with an embodiment of the present invention, the D/A converter 220 performs adaptable digital pre-equalization and pre-emphasis to raise the spectral tilt in order to remove the inherent Sinc spectral "droop" with increasing frequency and to maximize the signal energy across the bandwidth. Tilt correction values are inserted into the digital filter 210 by selecting values from the look-up table 150. The ping and start-up processor 240 determines these values in the look-up table 150 based on the "ping" test of the line. In accordance with an aspect of the present invention, the ping and start-up processor includes the look-up table 150.

The net beneficial effect of the DTMD process of the present invention is to pseudo-randomize and then orthogonalize the bit patterns. The DTMD system and method pseudo-randomizes the data stream so that the bit patterns do not have low frequency dominance, or periodic values, or a dc value in the event that incoming data is all 1s or 0s or some other peculiar pattern that would overstress the system. This enables the DTMD system to avoid other artifacts which could interfere with other channels and radiate excessively. The DTMD process of coupling the randomization process with the orthogonalization process flattens the signal's frequency structure to immunize the signal from amplitude variations across the spectrum produced by bridge taps and irregularities in the wire line.

In accordance with an embodiment of the present invention, the DTMD process is a bi-directional process wherein the ratio of frame from "up to down" (upstream to downstream) can change depending on the Level of Service (LoS) subscribed or demanded. For example, if the LoS calls for one high definition (HD) movie then most of the bandwith can be used except for moderate Internet surfing at a certain distance. If the LoS calls for two regular movies, Internet and one videoconference two-way link, then the ratio of "up to down" data rates has to change to accommodate this change in LoS. The "up" blocks of data are sent in a "dead" time allowed and prearranged by the down stream flow. The timing data for this is sent in the sync pair. The sync pair are very robust and can carry critical system operating data at all times. The LoS determines an appropriate "up and down" ratio, which is communicated between data and control processor 120 of the transceiver at the two ends of the channel and internally within the transceiver 100 via the ping and start-up processor 240.

Figure 2:
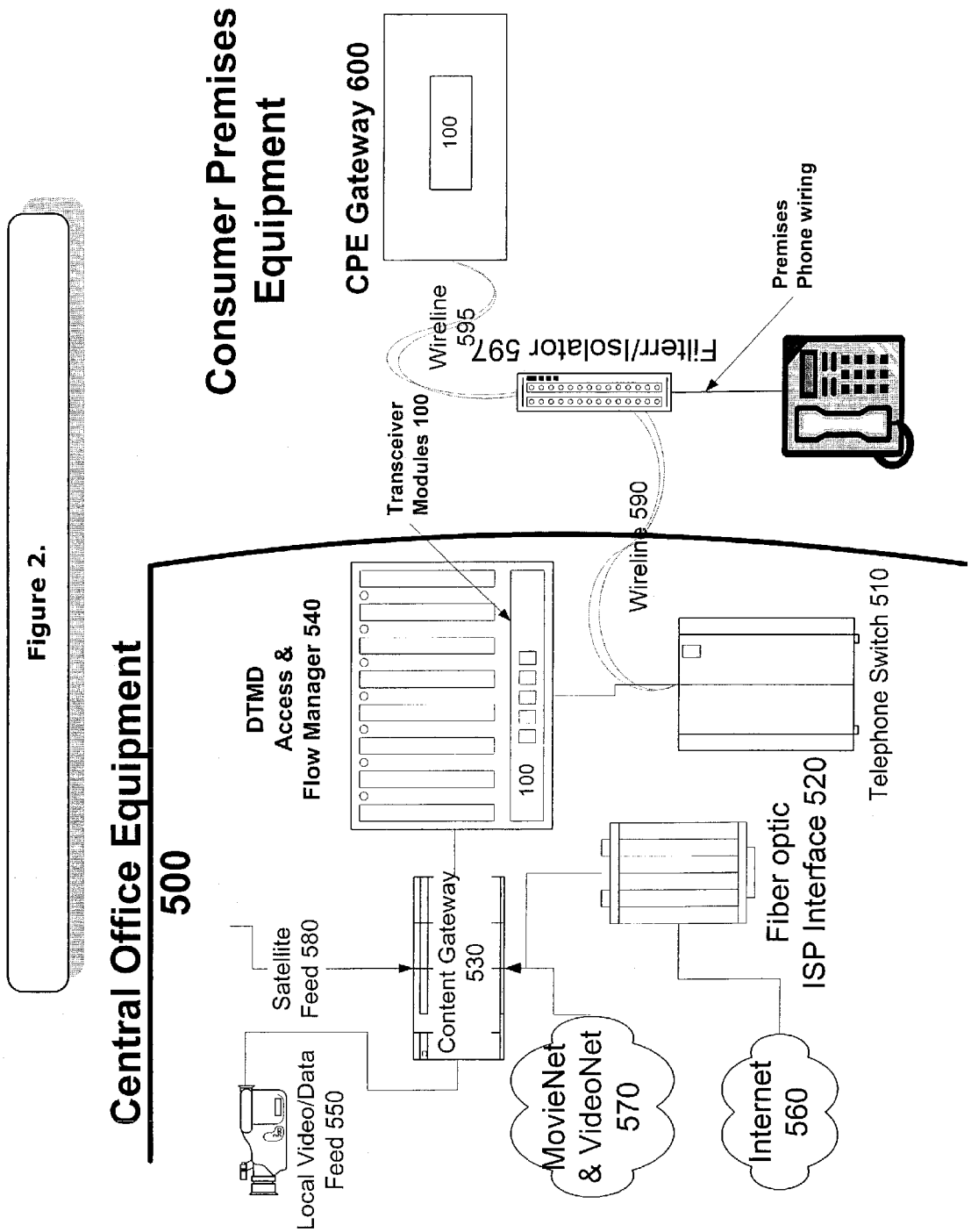
FIG. 2 is a block diagram of an exemplary broadband service architecture incorporating the DTMD system of the present invention.

Turning now to FIG. 2, there is illustrated an exemplary broadband service architecture (i.e., wire line application) incorporating the DTMD system of the present invention. The DTMD Access and Flow Manager 540 is located in the Central Office Equipment 500 and houses a plurality of transceivers 100 operating in simplex or duplex modes. The Access and Flow Manager 540 also contains power supply regulation and master timing control as well as interfaces to the telephone switch 510 and the content gateway 530, and the wire line bundle 590 to the customer premise equipment (CPE). At the central office, the telephone switch 510 is the existing device that allows conventional voice to be routed through the Public Switched Telephone Network (PSTN). The content gateway 530 is the aggregation point for various information sources such as the Internet 560 via its own gateway 520, a satellite feed 580 with video and digital data, a movie and video network interface 570, and a local video/data feed interface 550. The wire line connections to the CPE Gateway contain one or more transceiver(s) 100 utilizing exiting Telco wiring 590 and premises wiring 595. The CPE Gateway 600 are isolated from the phone wiring itself by a standard wire line filter 597.

In accordance with an embodiment of the present invention, the output-timing interval will not change except for overt dithering to avoid two adjacent channels having the same clock rate. The ping and start-up processor 240 and the data and control processor 120 establishes the output-timing interval nominally to be the reciprocal of the channel bandwidth. The DTMD access and flow manager 540 (FIG. 2) at the central office coordinates the multi-user installations and assures that no two clocks are the same value, i.e., Rule 2 of the Ten Rules.

The receiver 300 of the transceiver 100 comprises the data and control processor 120, the "ping" and start-up processor 240, an input terminator and spike suppressor 310, a pre-amp and NEXT canceller 320, an A/D converter 330, a sync correlator 340 (preferably asynchronous correlator 340), a data correlator 350 (preferably synchronous correlator 350), a word recovery buffer 360 to assemble the recovered bits into segments of length "n," a FEC 370, a de-randomizing buffer 380 to assemble and de-randomize the corrected data outputs, a data recovery buffer 390 to reassemble the data bits in order, and one or more high speed digital I/O ports 400, such as IR, printer, RJ-45 Ethernet, S-Video/RS-170 ports. Although not shown, the transceiver 100 may comprise only components related to the receiver 300.

The process of decoding the analog crankshaft waveform (i.e., the received DTMD signal) by the receiver 300 (or the transceiver 100 operating in a receiving mode) is now described in conjunction with process or flow diagram of FIG. 6. The input terminator and spike suppressor 310 preconditions the input DTMD signal received from the standard telephone line interface circuit against harmful spikes at step 2100. in the simplex mode, the input terminator and spike suppressor 310 transmits the preconditioned DTMD signal to the pre-amp and NEXT canceller 320.

In accordance with an embodiment of the present invention, in the duplex mode, the input terminator and spike suppressor 310 additionally blends the received DTMD signals and the DTMD signals to be transmitted by the transceiver 100 (or transmit DTMD signals) prior to forwarding the received signal to the pre-amp and NEXT canceller 320 at step 2110. The input terminator and spike suppressor 310 blends the transmit and received DTMD signals using a variable time division multiplexing of frames under the control of the ping and start-up processor 240. This enables the ping and start-up processor 240 to dynamically adjust the ratio of uplink to downlink (or "up to down") data rates of the transmit and received frames combined by the input terminator and spike suppressor 310. The location of the uplink frame is randomized to offset switching transients and "sprocketing" or repetitive pattern effects. In accordance with an embodiment of the present invention, the pre-amp and NEXT canceller 320 can be deactivated which effectively shuts down the receiving operation of the transceiver 100 (or the receiver 300) to avoid input overload. Alternatively, when the receiver 300 is not "listening" or receiving data, the transmitter 100 of the same transceiver 100 is activated to transmit data. That is, in a single line application, the transceiver 100 operates only in transmitting or receiving mode at any given time (i.e., in a half duplex mode). It is appreciated that the transceiver 100 can operate in a full duplex mode in a multi-line applications.

The pre-amp and NEXT canceller 320 amplifies the preconditioned DTMD signal to bring the amplitudes of the signal up to working levels for the follow-on circuits at step 2120. Also, the pre-amp and NEXT canceller 320 performs NEXT "sniffing" of the ingress from adjacent transmitters 110 at step 2120. The signal sniffing or estimating is done at initial installation by sampling the amount of each signal for every pair in the bundle and establishing a set of coefficients for the amount of cross-talk. The pre-amp and NEXT canceller 320 uses these coefficients to weight each adjacent wire line pair that is carrying the DTMD signals, forms a summation of weighted amplitudes and then subtracts them from the received energy on the channel for which the weighted sums apply. Since the "noise" generated by each DTMD transmitter 110 is deterministic, the sums can coherently remove the contribution of the other channels to the NEXT on that channel. In other words, the use of signal egress "sniffing" or "listening" by the ping and start-up processor 240 at the head end from the radiation of multiple DTMD channels enables the pre-amp and NEXT canceller 320 to pre-cancel the NEXT energy, thereby enabling the DTMD system to provide a greater self-noise immunity. It is appreciated that each channel requires a different set of weighted sums to remove the impinging NEXT relevant to each channel but this can be ascertained at the initial setup for the CO equipment.

The A/D converter 330 uses a clock rate that is at least 8× the transmission clock rate to sample the DTMD signal (i.e., the analog crankshaft waveform) at step 2130. The A/D converter 330 has a number of amplitude bits equal to or greater than that used for the transmitting D/A converter 220 (i.e., the dynamic range). A greater number of bits aids in establishing a digital AGC (automatic gain control). The faster clock rate improves the sampling estimation to be provided to the asynchronous correlator 340 and the synchronous correlator 350. The faster clock rate of the A/D converter 330 also aids in resolving the best time delay for data word correlation based on sync word location (i.e., oversampled sync word correlation). In accordance with an embodiment of the present invention, the A/D converter 330 comprises an equalizer 335. The equalizer 335 has adaptable coefficients (including clock rate) that are determined by the ping and start-up processor 240. The equalizer 335 is an adaptive digital filter running at nominally 8× the maximum correctable channel Bandwidth. It is appreciated that the use of a digital filter enables the ping and start-up processor 240 to auto-track the processing rates and bandwidths with the clock rates. That is, the shape of the resulting number set stays the same regardless of clock rate, so it auto tracks with the internal clock, which is set to satisfy system processing rates and bandwidths. The equalizer 335 optimizes the amplitude and phase characteristics of the wire line as exploited by the DTMD signal structure at step 2130. The sync word correlator 350 uses all 128-slip positions (for the 8× over-sampled case) to find the best amplitude fit to peak correlation. This optimum slip value is used to then position all of the data word correlations to the best time locations for the words. This reduces the total number of data word correlations and in the process of selection "decimates" or reduces the number of samples by a factor of 8 (or more) times.

The clock rate correlator 340, preferably asynchronous correlator, performs clock recovery optimization process at step 2140. It is appreciated that clock recovery process is coupled to the de-orthogonalizing process of step 2140 in a feedback relationship, as shown in FIG. 7. The clock recovery correlator 340 determines the position of the sync words in the correlation as a measure of clock phasing. The recovered clock phasing data can be compared to the initial clock sampling frequency to finely tune the clock sampling frequency. The clock recovery correlator 340 detects the sync words and clock timing, and supplies the optimum synchronization timing to the synchronous correlator 350. The feedback path is used by the clock recovery correlator 340 to ascertain the optimum sync code correlation since this is when the proper clock phasing is met. The clock recovery correlator 340 then provides the proper clock phasing information to the data and control processor 120 of the receiver 300 so it can be used by all other receiver processes.

The use of highly oversampled receive data as result of over-sampling by the A/D converter 330, enables the clock recovery correlator 340 to vernier locate the best "sync" word timing or time slip (i.e., oversampled sync word correlation) and thus permit synchronous correlation detection of the data words at step 2150. Normally, the correlation would only require a granularity equal to the number of "chips" in the ortho-vector, 16 in the example set forth herein. However by over-sampling by a factor of 8 for example by the A/D converter 330, the clock recovery correlator 340 can make a better estimate of time location of the correlation peak of the sync words. The synchronous correlator 350 can apply this delay factor to all the data words to perform a synchronous correlation "conditional to the sync timing" at step 2150. Without doing this delay and simplification, all data words need to be processed through all the correlation or time "slips" (8×16 or 128), and the process of de-orthogonalizing much slower and more expensive. The advantage of the invention is that the data words are processed through only one correlation or time slip (the correlation peak or optimum correlation slip). In accordance with an embodiment of the present invention, due to the process of synchronous detection and vernier tuning, the receiver 300 only needs to process the data words through the optimum slip position, thereby advantageously detecting the data with minimal calculations.

The synchronous correlator 350 de-orthogonalizes or decomposes the amplitude-encoded DTMD signal into its sovereign data bit components at step 2150. In accordance with an embodiment of the present invention, the synchronous correlator 350 uses a process to decompose (or correlate) the crankshaft waveform into its constituent waveforms that is different from the process used to generate the waveform summation by the transmitter 110. The embedded frame marker (i.e., sync pair) in each "crankshaft" waveform is used to establish the frame sync and can carry a low rate data stream as well. At a higher data level, the need to lock the FEC frames. The sync words can carry a "marker" to initialize the FEC to correctly detect and lock onto the FEC frames with low overhead and in minimum amount of time. The frame sync is derived from "locking" onto either but a specific ortho-vector whose value could be a logical "1" or "0."

The buffer 360 assembles the recovered data bits into words or segments of length "n" in its original format using any of the known means at step 2160. The words are then forwarded to the FEC 370, which removes the bit errors by employing FEC decoding at step 2170. Essentially, the FEC 320 removes the FEC overhead that the FEC 140 at the transmitting end added. The FEC overhead is removed when data or bit errors are corrected by the FEC using any appropriate conventional means. Preferably, the FEC 370 includes a buffer (not shown).

The buffer 380 assembles the corrected data outputs from the FEC 370 into an array for de-randomizing at step 2180. That is, the assembling process of the buffer 380 yields the original randomized bit patterns. Once the words are entered into an array, the buffer 380 de-randomizes/deciphers the words or data at step 2190. The buffer 390 reassembles the words into a data stream at a rate substantially identical to the original rate at the transmitting end at step 2200.

In accordance with an embodiment of the present invention, the system start-up and calibration process will now be described in conjunction with FIGS. 1 and 7. Upon a request from a customer for service, the ping and start-up processor 240 of the CPE-transceiver 100 initiates a "ping" tone which is received by the receiver 300 of the CO-transceiver 100. Upon receipt of the ping tone, the receiver 300 of the CO-transceiver 100 performs the following tasks:

1. The start-up processor 240 performs an analysis of the "ping" tone for signal amplitude and phase at various frequency locations;

2. The start-up processor 240 generates a profile of coefficients that are passed back to the CPE-transceiver 100 so the adaptive equalizer 335 of the CPE-transceiver 100 can be set;

3. The data and control processor 120 determines the maximum data rate which the system can support by calculating the reciprocal of the highest frequency that meets a preset criteria for the requested application;

4. This data rate number is sent to the CPE-transceiver 100 so that the data and control processor 120 of the CPE-transceiver 100 knows the nominal maximum channel rate;

5. The CPE-transceiver 100 communicates back to the customer the Level of Service (LoS) available for his/her session;

6. The customer then selects choices from a menu, which are sent back to the CO-transceiver 100;

7. The CO-transceiver 100 in concert with its processor 120 sends authentication requests to the source via a standard digital connection such as Ethernet;

8. When authorized by the external source, the CO-transceiver 100 sends a final clock rate number via its processor 120 to the CPE-transceiver 100 so that its processor 120 can establish the timing for the CPE unit;

9. At the CO-transceiver 100, its processor 240 generates a set of coefficients that are use in the digital filter 210 of the CPE-transceiver 100;

10. The CO-transceiver 100 samples the ambient channel noise using its processor 240 and sends the data to its processor 120 for an arithmetic calculation used to determine "m", which is then used to set up the array by selecting the vocabulary 150; and 11. With the known LoS, the input clock rate, the maximum channel rate, and the channel noise level, all factors n, m and r (the output channel rate) are known in processors 120 of the CO-transceiver 100 and the CPE-transceiver 100. Thus the initial set up of the DTMD system is complete.

In accordance with an embodiment of the present invention, a low power local RF links (e.g., 2.4 GHz FM, Bluetooth, and IEEE802.11) can be used to connect multiple channels of information to separate computers, peripherals, and/or TVs under the control of the data and control processor 120.

In accordance with an embodiment of the present invention, the ping and start-up processor 240 monitors or measures the Quality of Service (QoS) by assessing the FEC 370, the clock recovery correlator 34,0 the synchronous correlator 350, the clock rate, factors "p" and "m," and the number of levels in the crankshaft waveform. These adaptable performance parameters enable the inventive DTMD system and method to accommodate changes in line conditions and thereby regularly maximizing the throughput and quality without costly maintenance actions (truck rolls) or changes in technology.

What is claimed:

1. A method of generating a broadband carrier-less analog signal from a digital data stream for transmission over a channel, comprising the steps of:
   encoding the digital stream of data to provided an enhanced data signal without using carriers;
   pseudo-randomizing said enhanced data signal to provide a randomized data signal;
   framing said randomized data signal into a numerical matrix having a plurality of cells;
   orthogonalizing each cell value in said matrix to provide orthogonalized vectors, wherein one or more of said orthogonalized vectors are sync vectors and the remaining orthogonalized vectors are data vectors;
   summing said orthogonalized vectors on a per cell basis to generate spectrally shaped waveforms from said summed values; and
   converting said summed values into said broadband carrier-less analog signal.

2. The method of claim 1, further comprising the step of transmitting said broadband carrier-less analog signal over said channel.

3. The method of claim 1, wherein the step of orthogonalizing comprises the step of bi-polarizing said orthogonalized vectors.

4. The method of claim 1, wherein the step of pseudo-randomizing includes the step of pseudo-randomizing said enhanced signal with a predetermined pseudo-random code to lower the potential DC content and whiten the data spectrum of said enhanced signal, thereby minimizing periodic frequency tonals.

5. The method of claim 1, wherein the step of summing comprises the step of subtracting amplitude weight replicas of prior frames from said spectrally shaped waveform to improve inter symbol interference.

6. The method of claim 1, further comprising the step of filtering the spectrum of said spectrally shaped waveforms to minimize low and high frequency energy.

7. The method of claim 1, wherein the step of converting includes the step of converting said summed values into said broadband carrier-less analog signal that is faster than the channel nominal bandwidth.

8. The method of claim 1, wherein said sync vectors are orthogonal vectors and said data vectors are quasi-orthogonal vectors.

9. The method of claim 1, further comprising the steps of determining a compaction ratio based on transmission characteristics of said channel and establishing a maximum input data rate for said channel as a function of said compaction ratio.

10. The method of claim 9, further comprising the step of determining a vector length for said matrix based on transmission characteristics of said channel and establishing said maximum input data rate for said channel as a function of said compaction ration and said vector length.

11. The method of claim 10 further comprising the step of determining an output data rate as a function of an input data rate, said compaction ratio and said vector length.

12. A method of decoding a broadband carrier-less analog M-ary signal having orthogonalized data and sync vectors, comprising the steps of: sampling said broadband carrier-less analog M-ary signal to capture encoded number set; filtering said encoded number set to compensate for media effects during transmission of said broadband carrier-less analog M-ary signal; correlating said filtered number set against a vocabulary of orthogonalized vectors to detect sync word and encoded word; forward error correcting said encoded word to provide FEC corrected data; and de-randomizing said FEC corrected data to recover encoded data, wherein the step of sampling includes the step of oversampling said broadband carrier-less analog M-ary signal to provide an oversampled encoded number set, wherein the step of correlating comprises the steps of asynchronously correlating said oversampled encoded number set to vernier locate a time slip and synchronously correlating said oversampled encoded number set to determine said encoded word based on said time slip.

13. The method of claim 12, wherein the step of sampling includes the step of signal egress sniffing to reduce near end cross-talk (NEXT) from said broad-band carrier-less analog M-ary signal.

14. The method of claim 12, wherein the step of filtering includes the step of adaptively filtering using a digital filter.

15. The method of claim 12, further comprising the step of receiving said broadband carrier-less analog M-ary signal over a channel.

16. The method of claim 12, wherein the step of correlating includes the steps of asynchronously correlating said encoded number set to detect sync word and synchronously correlating said encoded number set to detect encoded word.

17. A method of transmitting and receiving broadband carrier-less analog M-ary signals over a channel, comprising the steps of:
   encoding a digital stream of data to provided an enhanced data signal without using carriers;
   pseudo-randomizing said enhanced data signal to provide a randomized data signal;
   framing said randomized data signal into a numerical matrix having a plurality of cells;
   orthogonalizing each cell value in said matrix to provide orthogonalized vectors, wherein one or more of said orthogonalized vectors are sync vectors and the remaining orthogonalized vectors are data vectors;

summing said orthogonalized vectors on a per cell basis to generate spectrally shaped waveforms from said summed values;

converting said summed values to encode the digital data stream into a first broadband carrier-less analog M-ary signal for transmission over said channel;

transmitting said first broadband carrier-less analog M-ary signal over said channel based on predetermined blanking intervals;

receiving a second broadband carrier-less analog M-ary signal over said channel based on complementary predetermined blanking intervals;

sampling said second broadband carrier-less analog M-ary signal to detect said data vectors and said sync vectors;

correlating said sync vectors and data vectors into data bits using a vocabulary of orthogonal and quasi-orthogonal vectors; and forward error correcting said data bits to provide FEC corrected data;

de-randomizing said FEC corrected data to recover into a data stream bits to recover the output data.

18. The method of claim 17, further comprising the step of pseudo-randomly varying blanking intervals and complementary blanking intervals based on a selected level of service.

19. The method of claim 17, further comprising the step of determining the transmission characteristics of said channel to determine a maximum level of service.

20. The method of claim 17, further comprising the steps of determining a compaction ratio based on transmission characteristics of said channel and establishing a maximum input data rate for said channel as a function of said compaction ratio.

21. The method of claim 20, further comprising the steps of determining a vector length for said matrix based on transmission characteristics of said channel and establishing said maximum input data rate for said channel as a function of said compaction ratio and said vector length.

22. The method of claim 21 further comprising the step of determining an output data rate based on an input data rate, said compaction ratio and said vector length.

23. The method of claim 21, further comprising the step of adaptively varying said compaction ratio and said vector length and an output data clock rate as function of dynamically varying transmission characteristics.

24. The method of claim 23, wherein the step of adaptively varying includes the step of determining said dynamically varying transmission characteristics as function of uncorrectable error values and sync correlator values.

25. The method of claim 17, further comprising the step of transmitting a ping signal to determine initial transmission characteristics of said channel.

26. The method of claim 17, further comprising the step of transmitting a bi-polar doublet function signal to determine initial transmission characteristics of said channel.

27. The method of claim 17, wherein said channel is bandwidth limited channel, and wherein the step of filtering includes the step of sinc sidelobe filtering to optimize the energy of said broadband carrier-less analog M-ary signal to the bandwidth of said channel.

28. The method of claim 17, wherein the step of converting converts said summed values to encode the digital data stream into said first broadband carrier-less analog M-ary signal having a crankshaft like profile.

29. The method of claim 17, further comprising the step of conveying internal system related data using said orthogonal sync vector.

30. A system for generating a broadband carrier-less analog signal from a digital data stream for transmission over a channel, comprising:

means encoding the digital stream of data to provided an enhanced data signal without using carriers;

means for pseudo-randomizing said enhanced data signal to provide a randomized data signal;

means for framing said randomized data signal into a numerical matrix having a plurality of cells;

means orthogonalizing each cell value in said matrix to provide orthogonalized vectors, wherein one or more of said orthogonalized vectors are sync vectors and the remaining orthogonalized vectors are data vectors;

means for summing said orthogonalized vectors on a per cell basis to generate spectrally shaped waveforms from said summed values; and means for converting said summed values into said broadband carrier-less analog signal.

31. A system for decoding a broadband carrier-less analog M-ary signal having orthogonalized data and sync vectors, comprising: means for sampling said broadband carrier-less analog M-ary signal to capture encoded number set; means for filtering said encoded number set to compensate for media effects during transmission of said broadband carrier-less analog M-ary signal; means for correlating said filtered number set against a vocabulary of orthogonalized vectors to detect sync word and encoded word; means for forward error correcting said encoded word to provide FEC corrected data; and means for de-randomizing said FEC corrected data to recover encoded data, wherein means for sampling includes means for oversampling said broadband carrier-less analog M-ary signal to provide an oversampled encoded number set, and wherein means for correlating comprises means for asynchronously correlating said oversampled encoded number set to vernier locate a time slip and synchronously correlating said oversampled encoded number set to determine said encoded word based on said time slip.

32. A system for transmitting and receiving broadband carrier-less analog M-ary signals over a channel, comprising the steps of:

means for encoding a digital stream of data to provided an enhanced data signal without using carriers;

means for pseudo-randomizing said enhanced data signal to provide a randomized data signal;

means for framing said randomized data signal into a numerical matrix having a plurality of cells;

means for orthogonalizing each cell value in said matrix to provide orthogonalized vectors, wherein one or more of said orthogonalized vectors are sync vectors and the remaining orthogonalized vectors are data vectors;

means for summing said orthogonalized vectors on a per cell basis to generate spectrally shaped waveforms from said summed values;

means for converting said summed values to encode the digital data stream into a first broadband carrier-less analog M-ary signal for transmission over said channel;

means for transmitting said first broadband carrier-less analog M-ary signal over said channel based on predetermined blanking intervals;

means for receiving a second broadband carrier-less analog M-ary signal over said channel based on complementary predetermined blanking intervals;

means for sampling said second broadband carrier-less analog M-ary signal to detect said data vectors and said sync vectors;

means for correlating said sync vectors and data vectors into data bits using a vocabulary of orthogonal and quasi-orthogonal vectors; and means for forward error correcting said data bits to provide FEC corrected data; and means for de-randomizing said FEC corrected data to recover into a data stream bits to recover the output data.

* * * * *